Dec. 27, 1949 J. L. STINNETT 2,492,506
AUTOMOBILE HEATING, VENTILATING
AND WINDOW DEFROSTING SYSTEM
Filed Sept. 20, 1946 3 Sheets-Sheet 1
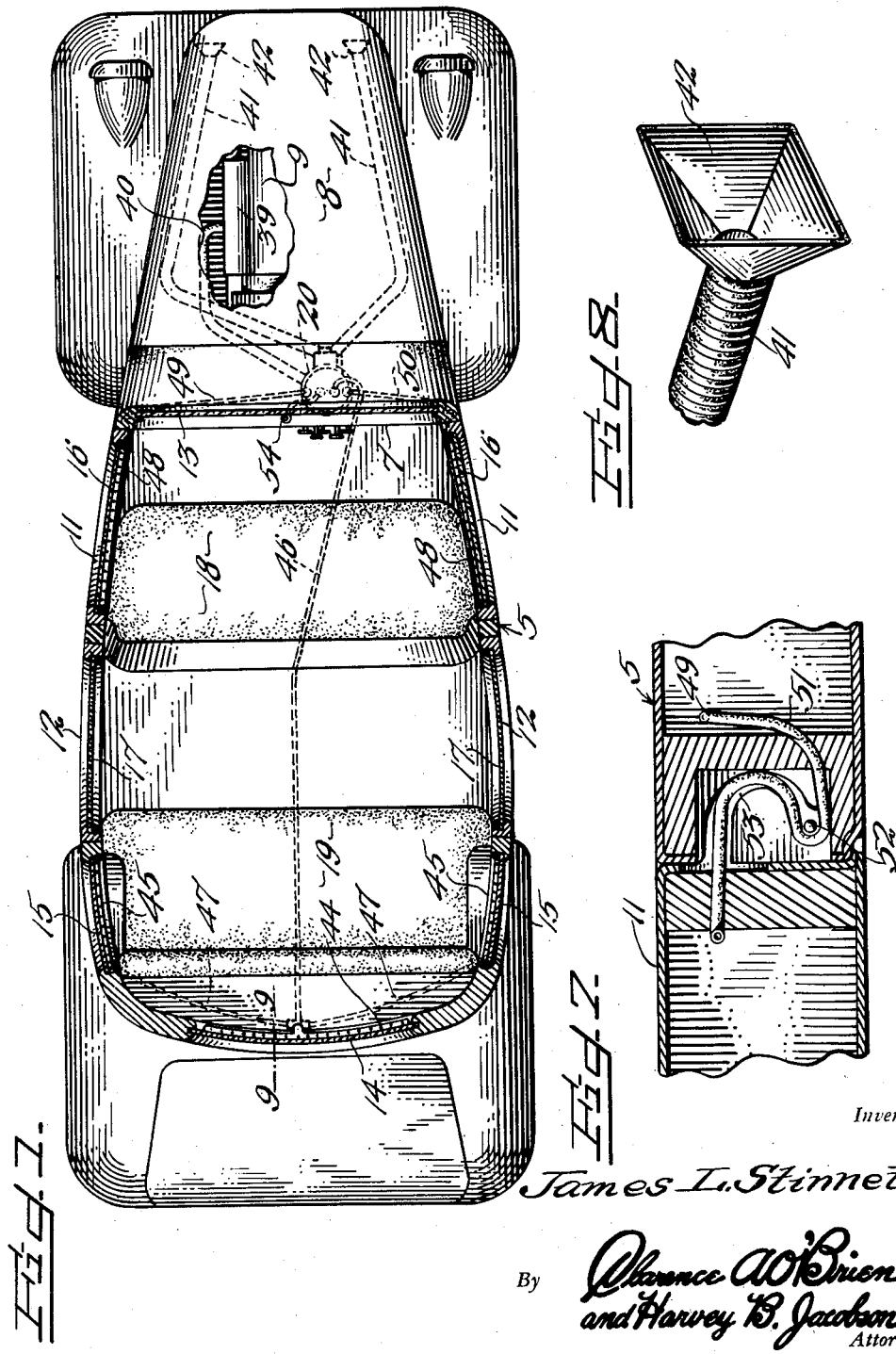
Inventor
James L. Stinnett.
By Clarence A. O'Brien
and Harvey B. Jacobson
Attorneys

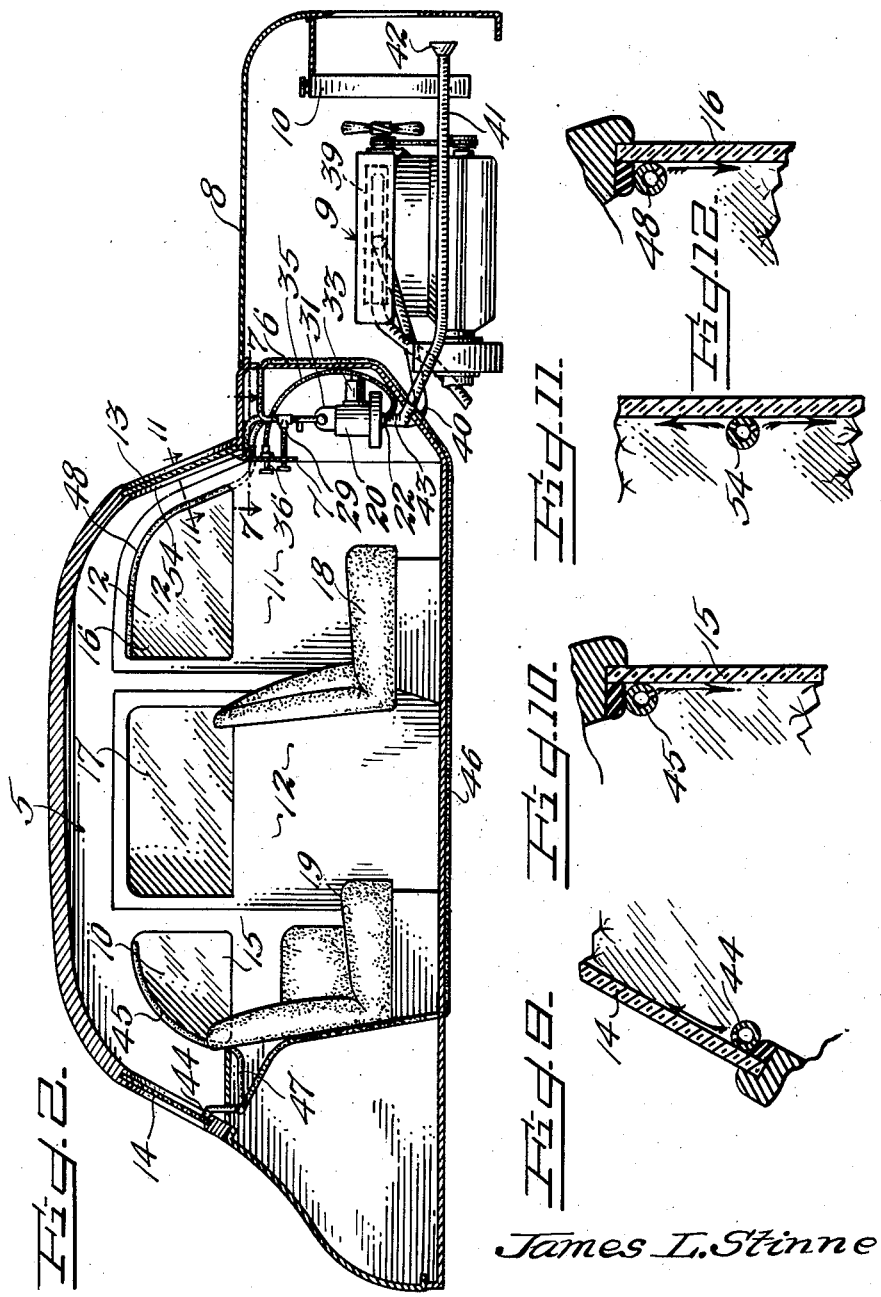

Dec. 27, 1949  J. L. STINNETT  2,492,506
AUTOMOBILE HEATING, VENTILATING
AND WINDOW DEFROSTING SYSTEM
Filed Sept. 20, 1946   3 Sheets-Sheet 3
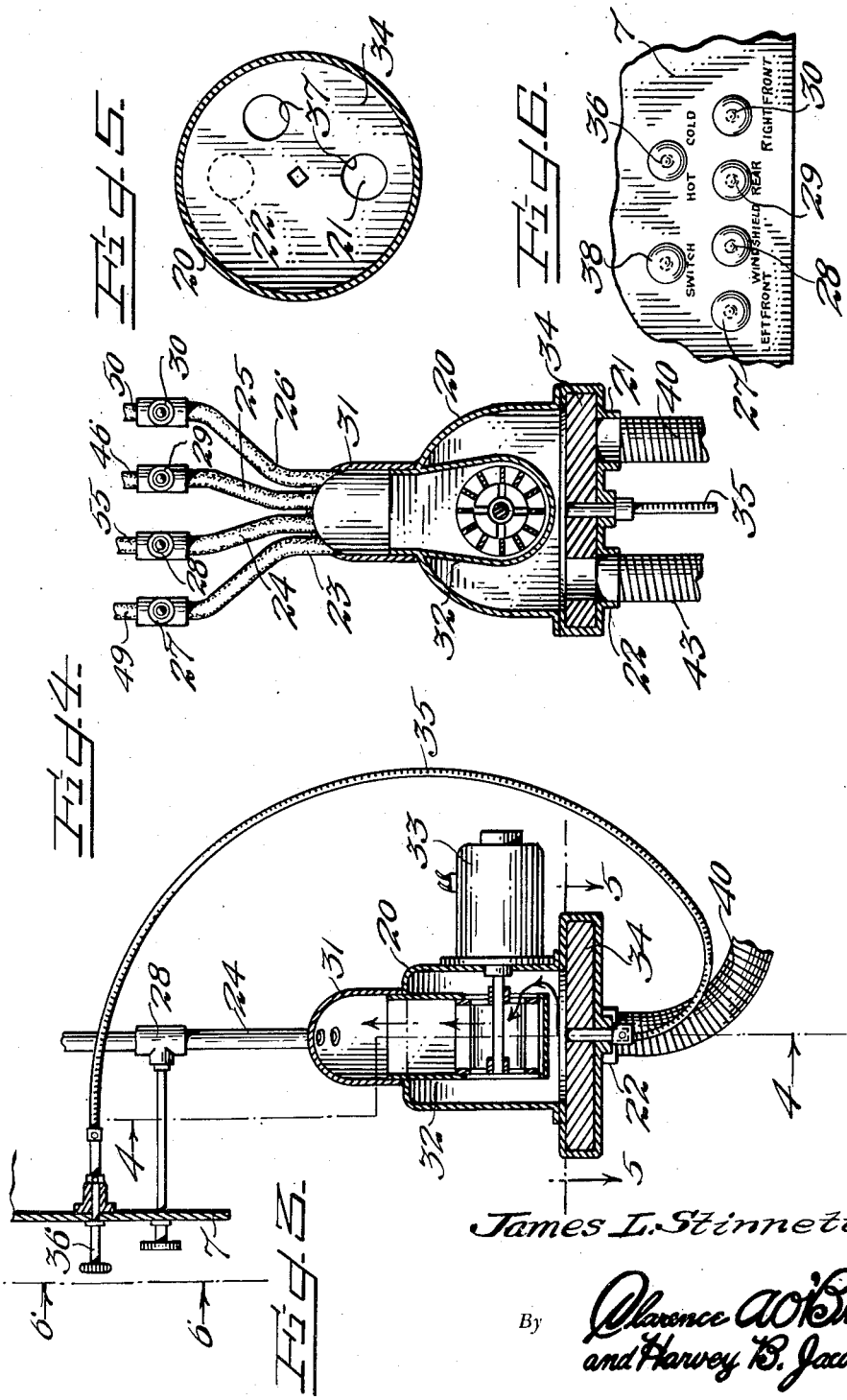
Inventor
James L. Stinnett.
By Clarence A. O'Brien
and Harvey B. Jacobson
Attorneys Patented Dec. 27, 1949

2,492,506

UNITED STATES PATENT OFFICE 2,492,506

AUTOMOBILE HEATING, VENTILATING, AND WINDOW DEFROSTING SYSTEM

James L. Stinnett, Chicago, Ill.

Application September 20, 1946, Serial No. 698,266

2 Claims. (Cl. 98—2)

This invention relates to a heating, ventilating and window defrosting system for passenger motor cars having enclosed bodies.

An object of the present invention is to provide a system of the above kind whereby either heated or unheated air may be taken from outside the automobile body and distributed to a plurality of points within such body for evenly heating or ventilating the same.

A further object of the invention is to provide a system of the above kind whereby heated air may be directed across the surfaces of the body, door and windshield windows of the automobile for effectively defrosting said windows in cold weather.

A still further object of the invention is to provide a system of the above kind which is comparatively simple, easy and economical to manufacture and install, and easy and convenient to control from the driver's seat.

Other and more specific objects and features of the invention will become apparent from the following description when considered in connection with the accompanying drawings, in which:

Figure 1 is a top plan view of an automobile having the present invention applied thereto, parts being broken away and in section.

Figure 2 is a side elevation thereof, parts being broken away and in section.

Figure 3 is an enlarged fragmentary detail view, partly in elevation and partly in section, showing the air manifold housing, blower and adjacent parts.

Figure 4 is a section taken on line 4—4 of Figure 3.

Figure 5 is a horizontal section taken on line 5—5 of Figure 3.

Figure 6 is a fragmentary rear elevational view of the instrument panel, showing the arrangement of control elements.

Figure 7 is an enlarged fragmentary section taken substantially on line 7—7 of Figure 2 adjacent one of the front door hinges.

Figure 8 is an enlarged fragmentary perspective view showing one of the unheated air inlet pipes and its intake funnel.

Figure 9 is an enlarged fragmentary section taken on line 9—9 of Figure 1.

Figure 10 is a view similar to Figure 9 taken on line 10—10 of Figure 2, and

Figures 11 and 12 are views similar to Figure 9 taken respectively on line 11—11 and 12—12 of Figure 2.

Referring in detail to the drawings, 5 indicates the body, 6 the dash, 7 the instrument panel, 8 the engine hood, 9 the engine, and 10 the radiator of an automobile of the standard two-door sedan type. The body has front doors 11, rear doors 12, a front windshield 13, back and side rear body windows 14 and 15, and sliding windows 16 and 17 for the front and rear doors 11 and 12 respectively. Arranged within the body are the usual front and rear seats 18 and 19, respectively.

As shown, the present invention includes an air manifold housing 20 having two bottom air inlets 21 and 22 and a plurality of air outlets 23, 24, 25 and 26 respectively controlled by shut-off valves 27, 28, 29 and 30. The air outlets rise from the top of a dome 31 which communicates with the outlet of a fan blower 32 whose fan is driven by an electric motor 33, the side inlets of the blower 32 communicating with the lower portion of housing 20 as shown clearly in Figure 3. A manually operable valve 34 is provided for selectively admitting air to the housing 20 from the desired one of the inlets 21 and 22. As shown, this valve may comprise a horizontal rotary disc rotatably fitted in a lower portion of the housing 20 and rotatably adjustable by means of a flexible shaft 35 extended to an operating stem 36 extended through and journalled in the panel 7. The valve disc 34 has openings 37 which are selectively registrable with the inlets 21 and 22. Also, the valves 27, 28, 29 and 30 have operating stems which extend through the panel 7, and it will thus be apparent that the valves are within convenient reach of the driver occupying the front seat 18. Also, the motor 33 is controlled by a suitable switch mounted on the panel 7 and having an operating stem equipped with a handle or knob 38 as shown in Figure 6, the stem of said switch extending through the panel 7 for convenient actuation of the switch by the driver of the automobile.

Means is provided to supply heated air to the inlet 21 from outside the body 5, which means preferably consists of a stove 39 associated with the exhaust manifold of engine 9 and having an outlet pipe 40 connected to the inlet 21. Means is also provided to supply unheated air to the air inlet 22 from outside the vehicle body, the same including ducts 41 which extend forwardly on either side of the engine 9 and radiator 10 and terminate at their forward ends in intake funnels 42, the rear ends of said ducts 41 being connected by a pipe 43 that connects with the inlet 22. Thus, valve 34 may be adjusted to admit air either from the pipe 40 or pipe 43, depending upon whether it is desired to heat the interior of the automobile body and to defrost the windows, or to merely ventilate the same. Fresh air is forced, by reason of the forward movement of the vehicle to and through housing 20, but the supply may be increased by throwing the blower into operation.

Air discharge nozzles 44 and 45 for directing jets of air across the inner surfaces of the rear body windows 14 and 15, are connected by a pipe 46 and branches 47 to the outlet 25. Other air discharge nozzles 48 for respectively directing air across the inner surfaces of the left and right front door windows, are respectively connected to the air outlets 23 and 26 by pipes 49 and 50. The pipes 49 and 50 must pass the hinged sides of the front doors 11, and to provide for this in a practical manner, said pipes 49 and 50 have flexible sections 51 which pass around the pivot 52 of the door hinge 53 and follow that part of the latter which is fastened to the door (Fig. 7). Obviously, this flexible section 51 permits opening and closing of the door without interfering with the flow of air to the nozzles 48 and without damage to the pipe sections 51. Still another air discharge nozzle 54 for directing air across the inner surface of the windshield window 13 is connected by a pipe 55 with the outlet 24, the nozzle 54 being vertically positioned at the center of the windshield window and adapted to discharge laterally at opposite sides thereof as shown in Figure 11. While the nozzles are shown as separate elements suitably mounted in place, they may be special mouldings for the windows as is generally well-known in the art.

In operation, upon forward travel of the automobile, unheated air from outside the automobile body will be directed into the pipes 41 by their funnels 42, and this unheated air may be discharged into the automobile body through the several nozzles or any selected one or more thereof by adjusting the valve 34 to the position shown in Figure 4 and suitably manipulating the valves for the air outlets 23, 24, 25 and 26. Heating may be accomplished in the same way by adjusting valve 34 from the position of Figure 4 to the position thereof wherein the inlet 22 is closed and the inlet 21 is open, heated air being then derived from pipe 40 and stove 39. The valves in the air outlets of dome 31 may be adjusted to control the volume of air supplied, and it will be apparent that the air supplied to the interior of the body may be discharged at points throughout the body so as to secure efficient and uniform ventilation or heating. Obviously, when hot air is discharged from the nozzles, it will cause the windows to be defrosted in cold weather because the hot air is directed across the inner surfaces of said windows. During heating and defrosting or ventilation, the blower is preferably in operation so that the air is forcibly supplied to the interior of the automobile body.

From the foregoing description, it is believed that the construction, operation and advantages of the present invention will be readily understood and appreciated in the art. Minor changes are contemplated such as fall within the scope of the invention as claimed.

What I claim is:

1. In an automobile of the closed type, an air manifold housing having two bottom air inlets and four top valve controlled air outlets, means to supply hot air to one of said air inlets, means to supply unheated air to the other of said air inlets from outside the vehicle body, a single manually operable rotary disk valve in the bottom of said housing having ports selectively registrable with the respective air inlets for selectively admitting air to said housing from the desired one of said inlets, a motor operated fan blower mounted in said housing for forcibly discharging the air from said housing through any of said outlets which are opened, air discharge nozzles for directing jets of air across the inner surfaces of the rear body windows of the automobile connected to one of said air outlets, other air discharge nozzles for respectively directing air across the inner surfaces of the left and right front door windows of the automobile respectively connected to other separate ones of said air outlets, still another air discharge nozzle for directing air across the inner surface of the windshield window of the automobile connected to the remaining one of said air outlets, and means for controlling the blower-operating motor.

2. A heating, ventilating and window defrosting system for automobiles of the closed type, comprising an air manifold housing mounted beneath the cowl of the automobile, said manifold having two bottom air inlets and four top valve controlled air outlets, a motor operated fan blower disposed within said housing for discharging air from the latter through said air outlets, means for controlling the blower operating motor, the controlling valves of the air outlets and the controlling means for the blower operating motor being provided with manipulating elements adjacent the instrument board of the vehicle for convenient actuation by the driver of the automobile, means to supply hot air to one of said air inlets from outside the automobile body, means to supply unheated air to the other of said air inlets from outside the automobile body, a single manually operable rotary disk valve mounted in the bottom of said housing having ports selectively registrable with the respective air inlets for selectively admitting air to said housing from the desired one of said inlets, said last named valve having a manipulating element adjacent the instrument board and within reach of the driver, air discharge nozzles for directing jets of air across the inner surfaces of the rear body windows connected to one of said air outlets, other air discharge nozzles for respectively directing air across the inner surfaces of the left and right front door windows of the automobile respectively connected to other separate ones of said air outlets, and still another air discharge nozzle for directing air across the inner surface of the windshield window connected to the remaining one of said air outlets.

JAMES L. STINNETT.

REFERENCES CITED

The following references are of record in the file of this patent:

UNITED STATES PATENTS

| Number | Name | Date |
|---|---|---|
| 1,751,686 | Duerk | Mar. 25, 1930 |
| 2,026,929 | Backe | Jan. 7, 1936 |
| 2,104,394 | Halbleib | Jan. 4, 1938 |
| 2,133,488 | Stearns | Oct. 18, 1938 |
| 2,150,110 | Strauss et al. | Mar. 7, 1939 |